United States Patent Office 3,755,403
Patented Aug. 28, 1973

3,755,403
1-CARBAMOYL-N-HYDROXY FORMIMIDATES AND 1 - CARBAMOYL - N-CARBAMOYLOXY FORMIMIDATES
Russell F. Bellina, Claymont, Del., assignor to E. I. du Pont de Nemours and Company, Wilmington, Del.
No Drawing. Filed July 15, 1970, Ser. No. 55,290
Int. Cl. C07c *119/16*
U.S. Cl. 260—453 R                13 Claims

ABSTRACT OF THE DISCLOSURE

A class of 1-carbamoyl-N-carbamoyloxy formimidates, such as methyl 1-(dimethylcarbamoyl) - N - (methylcarbamoyloxy)-formimidate, useful in preventing the destructive effects of pests such as insects, ticks, mites and nematodes.

BACKGROUND OF THE INVENTION

This invention relates to chemical pesticides and is more particularly directed to a class of novel 1-carbamoyl-N-carbamoyloxy formimidates, and their use as pesticides.

British Patent 1,181,023 discloses a class of pesticidal 1 - carbamoyl - N - (substituted carbamoyloxy)thioformimidates, such as methyl 1-carbamoyl-N-(methylcarbamoyloxy)thioformimidate, and their use as pesticides. These thioformimidates are prepared by carbamylating an intermediate 1-carbamoyl-N-hydroxythioformimidate. The intermediate 1-carbamoyl-N-hydroxythioformimidate is prepared by reacting a 1-carbamoylformhydroxamyl chloride with a mercaptan in the presence of a base, or by reacting a methoxycarbonylformhydroxamyl chloride with a mercaptan in the presence of a base to form a 1-methoxycarbonyl-N-hydroxythioformimidate and then reacting the product with an appropriate amine.

The 1-carbamoyl - N - carbamoyloxy formimidates of this invention are made in a similar manner by carbamylating an intermediate 1 - carbamoyl - N - hydroxyformimidate. However, the 1-carbamoyl-N-carbamoyloxy formimidates have never before been available, because there has not been available a method of making the necessary 1-carbamoyl-N-hydroxyformimidate intermediates. The alcohols are not as reactive as the mercaptans, and do not react directly with a formhydroxamyl chloride, as the mercaptans do. This is apparent from the fact that methanol was used as solvent in Example 1 of the British patent.

This invention is based in part on the discovery of a way to make the 1-carbamoyl - N - hydroxyformimidates which are necessary intermediates for making the pesticidal 1-carbamoyl-N-carbamoyloxy formimidates. It has been discovered that the necessary intermediates can be obtained by reacting a 1-carbamoylformhydroxamyl chloride with two equivalents of base, at least the second of which is an alkoxide. The first equivalent of base generates a 1-(carbamoyl)nitrile oxide, which will react with the equivalent of alkoxide to form the intermediate 1-carbamoyl-N-hydroxyformimidate. This intermediate can then be converted to pesticidal 1-carbamoyl-N-carbamoyloxy formimidates using conventional reactions.

The invention is also based on the discovery that the 1-carbamoyl-N-carbamoyloxy formimidates exhibit good pesticidal activity, combined with a good margin of safety for host plants and mammals.

The invention therefore makes available for the first time a novel class of compounds which are effective tools in preventing the serious economic loss caused each year by pests.

SUMMARY OF THE INVENTION

This invention is a class of novel 1-carbamoyl-N-carbamoyloxy formimidates of the formula:

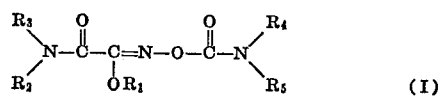

where:

$R_1$ is glycidyl; alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 halogen atoms or with a methoxy, ethoxy, nitro, cyano, hydroxy, methylthio, carboxy, carbomethoxy, carboethoxy, amino, methylamino, ethylamino, dimethylamino, methylethylamino, methylpropylamino, or diethylamino group;

$R_2$ and $R_3$ taken separately are the same or different and are hydrogen; alkyl of 1 through 4 carbon atoms; alkenyl of 3 through 4 carbon atoms; methoxy; or cycloalkyl of 3 through 5 carbon atoms; or taken together are alkylene of 2 through 6 carbon atoms; with the proviso that $R_2$ and $R_3$ do not contain a total of more than 7 carbon atoms, and are not both cycloalkyl or methoxy;

$R_4$ is hydrogen, alkyl of 1 through 3 carbon atoms, allyl, or propargyl; and $R_5$ is hydrogen or methyl.

Preferred because of their higher activity are the compounds of Formula I wherein:

$R_1$ is alkyl of 1 through 4 carbon atoms; allyl; or alkyl of 1 through 4 carbon atoms substituted with 1 through 3 chlorine atoms or with a nitro, cyano, or methoxy group;

$R_2$ is hydrogen; alkyl of 1 through 4 carbon atoms; or methoxy;

$R_3$ is hydrogen or alkyl of 1 through 4 carbon atoms; and $R_4$ and $R_5$ are the same or different and are hydrogen or methyl.

Most preferred because of their higher activity and ease of snythesis are the compounds of Formula I wherein:

$R_1$ is methyl, ethyl or allyl;
$R_2$ is hydrogen, alkyl of 1 through 4 carbon atoms, or methoxy;
$R_3$ is hydrogen or alkyl of 1 through 4 carbon atoms;
$R_4$ is hydrogen or methyl; and
$R_5$ is methyl.

The compounds of the invention can exist in either or both the syn and anti geometric isomers.

The invention also includes pesticidal compositions comprising a pesticidally effective amount of a compound of Formula I and a suitable diluent, and a method of controlling pests comprising applying to a locus to be protected a pest-controlling amount of a compound of Formula I.

The invention further includes a class of novel 1-carbamoyl-N-hydroxyformimidates of the formula:

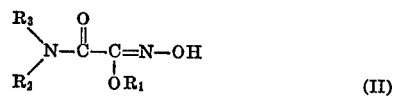

wherein $R_1$, $R_2$, and $R_3$ are as defined above for Formula I. The compounds of Formula II are intermediates for the compounds of Formula I.

Finally, the invention includes a novel method of preparing the compounds of Formula II which comprises reacting a 1-carbamoylformhydroxamyl chloride of the formula:

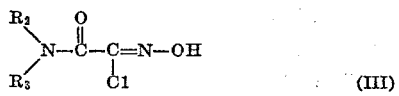
(III)

with two equivalents of base, at least the second equivalent of which is an alkoxide of the formula $R_1OM$ (IV), wherein $R_1$, $R_2$, and $R_3$ are as defined above for Formula I, and M is $Na^+$, $K^+$, $Li^+$, or $Cs^+$. The first equivalent of base can be, and preferably is, the same alkoxide used as the second equivalent of base. The reaction is carried out in an inert organic solvent at a temperature in the range from about $-70°$ C. to $+25°$ C.

DESCRIPTION OF THE INVENTION

Preparation

The compounds of Formula I wherein both $R_4$ and $R_5$ are hydrogen are prepared by reacting an appropriate intermediate of Formula II with sodium cyanate and hydrochloric acid at low temperature. The reaction is illustrated by Equation A:

(A)

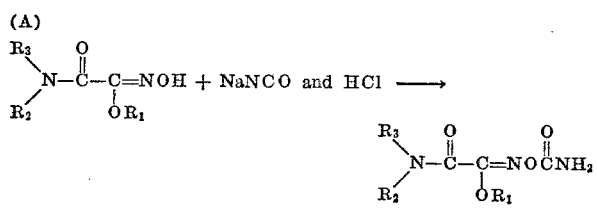

The compounds of Formula I wherein only one of $R_4$ and $R_5$ is hydrogen are prepared by allowing an appropriate intermediate of Formula II to react with a substituted isocyanate in an inert solvent such as acetone or acetonitrile. This reaction is illustrated by Equation B:

(B)

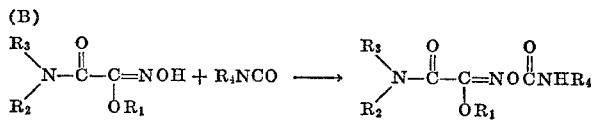

The compounds of Formula I wherein neither $R_4$ nor $R_5$ is hydrogen are prepared by reacting an appropriate intermediate of Formula II with sodium hydride in a solvent such as tetrahydrofuran and treating the resulting salt with a substituted carbamoyl chloride. This reaction is illustrated by Equation C:

(C)

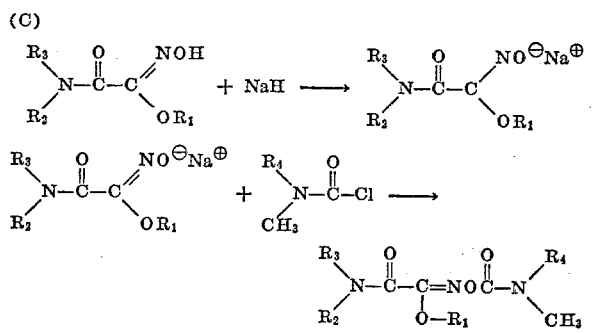

The intermediates of Formula II are made by reacting a 1-carbamoylformhydroxamyl chloride of the formula:

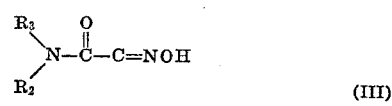
(III)

with two equivalents of base, at least the second of which is an alkoxide of the formula $R_1OM$ (IV), where M is $Na^+$, $K^+$, $Li^+$, or $Cs^+$. The first equivalent of base generates a 1-(carbamoyl) nitrile oxide of the formula:

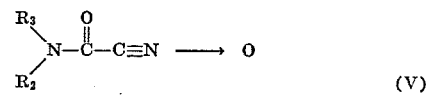
(V)

which will react with the equivalent of alkoxide to form the desired intermediate. The overall reaction is illustrated by Equation D:

(D)

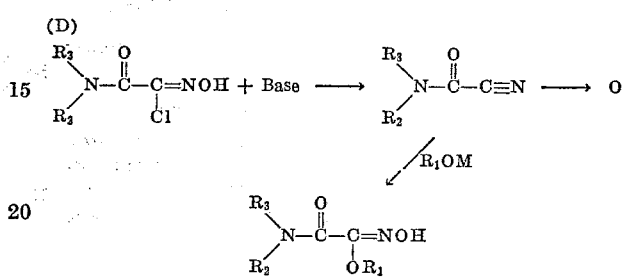

The first equivalent of base can be an inorganic base such as sodium carbonate or an organic base such as triethylamine. Preferably, however, the first equivalent of base is the same alkoxide ($R_1OM$) which is used as the second equivalent. The reaction is conducted in an inert solvent which can be the alcohol corresponding to the alkoxide used (i.e. an alcohol of formula $R_1OH$) or another inert solvent such as benzene, tetrahydrofuran, dimethylformamide, dioxane, diethylether, or acetonitrile. The reaction can be conducted at a temperature in the range of about $-70°$ C. to $+25°$ C. Lower temperatures, in the range of about $-70°$ C. to $-10°$ C., are preferred. The reaction product is often isolated as the alkali metal salt, which can be washed with an organic solvent such as methylene chloride or ether. The oxime is subsequently freed from the cation by the cautious addition of a mineral acid such as hydrochloric acid to an aqueous solution of the salt.

Pests controlled

Representative of the insects, ticks, mites and nematodes from which the compounds of Formula I offer protection are the following:

Aphids—

Bean aphid—*Aphis fabae*
    Cabbage aphid—*Brevicoryne brassicae*
    Corn leaf aphid—*Aphis maidis*
    Corn root aphid—*Anuraphis maidiradicis*
    Cotton aphid—*Aphis gossypii*
    Grape phylloxera—*Phylloxera vitifoliae*
    Green peach aphid—*Myzus persicae*
    Potato aphid—*Macrosiphum solanifolii*
    Wooly apple aphid—*Eriosoma lanigerum*

Armyworms—

Fall armyworm—*Laphygma frugiperda*
    Southern armyworm—*Prodenia eridania*

Beetles—

Asiatic garden beetle—*Autoserica castanea*
    Bean leaf beetle—*Cerotoma trifurcatea*
    Cigarette beetle—*Lasioderma serricorne*
    Colorado potato beetle—*Leptinotarsa decemlineata*
    Japanese beetle—*Popillia japonica*
    Mexican bean beetle—*Epilachna varivestis*
    Squash beetle—*Epilachna borealis*
    Sugarcane beetle—*Euetheola regiceps*
    White-fringed beetle—*Graphognathus leucoloma*
    Boll weevil—*Anthonomus grandis*
    Bollworm—*Heliothis zea*

Borers—

European cornborer—*Pyrausta nubilalis*
    Peach tree borer—*Sanninoidea exitiosa*
    Squash vine borer—*Melittia cucurbitae*
    Sugarcane borer—*Diatraea saccharalis*

Butterflies—

Clouded sulphur—*Colias philodice*
    Imported cabbageworm—*Pieris rapae*

Caterpillars—

Alfalfa caterpillar—*Colias eurytheme*
    Eastern tent caterpillar—*Malacosoma americanum*

Curculio, plum—*Conotrachelus nenuphar*
Earworm, corn—*Heliothis zea* (see bollworm)

Flea beetles—

Corn flea beetle—*Chaetocnema pulicaria*
    Potato flea beetle—*Epitrix cucumeris*
    Tobacco flea beetle—*Epitrix hirtipennis*

Fleahopper, cotton—*Psallus seriatus*

Flies—

Black fly (citrus)—*Aleurocanthus woglumi*
    Hessian fly—*Phytophaga destructor*
    Horn fly—*Siphona irritans*
    House fly—*Musca domestica*
    Stable fly—*Stomoxys calcitrans*

Fruit flies—

Mediterranean fruit fly—*Ceratitis capitata*
    Mexican fruit fly—*Anastrepha ludens*
    Oriental fruit fly—*Dacus dorsalis*

German cockroach—*Blattella germanica*
Leaf rollers—

Fruit tree leaf rollers—*Archips argyrospila*
    Red-banded leaf roller—*Argyrotaenia velutinana*

Leaf miners—

Serpentine leaf miner—*Liriomyza brassicae*

Leafhoppers—

Beet leafhopper—*Circulifer tenellus*
    Potato leafhopper—*Empoasca fabae*
    Sugarcane leafhopper—*Perkinsiella saccharicida*

Leafworm, cotton—*Alabama argillacea*
Maggot, seed-corn—*Hylemya platura*
Mealybugs—

Citrus mealybug—*Pseudococcus citri*
    Pineapple mealybug—*Pseudoccous brevipes*

Mites—

Citrus red mite—*Paratetranychus citri*
    Clover mite—*Bryobia praetiosa*
    European red mite—*Panonychus ulmi*
    Pacific mite—*Tetranychus pacificus*
    Two-spotted mite—*Tetranychus urticae*

Mosquitoes—

Common malaria mosquito—*Anopheles quadrimaculatus*
    Salt-marsh mosquito—*Aedes sollicitans*
    Southern house mosquito—*Culex pipiens quinquefasciatus*

Moths—(Damage caused by immature forms called larvae)

Clothes moth—*Tineola biselliella*
    Codling moth—*Carpocapsa pomonella*
    European pine shoot moth—*Rhyacionia buoliana*
    Grape berry moth—*Polychrosis viteana*
    Gypsy moth—*Porthetria dispar*
    Melonworm—*Diaphania hyalinata*
    Oriental fruit moth—*Grapholitha molesta*
    Pickleworm—*Diaphania nitidalis*

Nematodes—

Awl nematode—*Dolichodorus heterocephalus*
    Banana nematode—*Pratylenchus musicola*
    Bud and leaf nematodes—*Aphelenchoides* spp.
    Burrowing nematode—*Radopholus similus*
    Carrot root nematode—*Heterodera carotae*
    Coffee root-knot nematode—*Meloidogyne exigua*
    Corn nematode—*Pratylenchus zeae*
    Dagger nematodes—*Xiphinema* spp.
    Golden nematode—*Heterodera rostochiensis*
    Grass nematode—*Anguina agrostis*
    Lance nematodes—*Hoplolaimus* spp.
    Lesion nematodes—*Pratylenchus* spp.
    Northern root-knot nematode—*Meloidogyne hapla*
    Pea root nematode—*Heterodera gottingiana*
    Peanut root-knot nematode—*Meloidogyne arenaria*
    Pin nematodes—*Paratylenchus* spp.
    Potato rot nematode—*Ditylenchus destructor*
    Reniform nematode—*Rotylenchulus reniformus*
    Rice nematode—*Ditylenchus angustus*
    Ring nematodes—*Criconemoides* spp.
    Smooth-headed lesion nematode—*Pratylenchus brachyurus*
    Southern root-knot nematode—*Meloidogyne incognita*
    Soybean cyst nematode—*Heterodera glycines*
    Spiral nematodes—*Helicotylenchus* spp.
    Stem and bulb nematode—*Ditylenchus dipsaci*
    Sting nematodes—*Belonolaimus* spp.
    Stubby-root nematodes—*Trichodorus* spp.
    Sugar bet nematode—*Heterodera schachtii*
    Tobacco cyst nematode—*Heterodera tabacum*
    Tobacco stunt nematode—*Tylenchoryhynchus claytoni*
    Wheat nematode—*Anguina tritici*

Plant bugs—

Tarnished plant bug—*Lygus lineolaris*
    Apple red bug—*Lygidea mendax*

Pink bollworm—*Pectinophora gossypiella*
Rootworms—

Northern corn rootworm—*Diabrotica longicornis*
    Southern corn rootworm—*Diabrotica undecimpunctata howardi*
    Western corn rootworm—*Diabrotica vigifera*

Thrips—

Onion thrips—*Thrips tabaci*
    Tobacco thrips—*Frankliniella fusca*

Ticks—

American dog tick—*Dermacentor variabilis*
    Fow tick—*Argas persicus*
    Rocky Mountain Wood tick—*Dermacentor andersoni*

Tobacco budworm—*Heliothis virescens*
Weevils—

Alfalfa weevil—*Hypera postica*
    Granary weevil—*Stiophilus granarius*
    Rice weevil—*Sitophilus oryae*
    Sweetpotato weevil—*Cylas formicarius elegantulus*

FORMULATIONS

Compositions of this invention suitable for practical use as pesticides will include one or more compounds of Formula I above either individually, in admixture with each other, or in admixture with other pesticides, and can include surface-active agents, solid or liquid diluents and other materials as desired to produce wettable powders, suspensions, emulsifiable concentrates, dusts, solutions, granules, pellets or high-strength compositions.

Surfactants

The surface-active agents or surfactants, as they are sometimes called, useful in formulating the compounds of this invention act as wetting, dispersing and emulsifying agents and assist dispersion of the active material in a spray. Additionally, the surfactants act as spreaders which aid in obtaining even coverage of the surfaces to be protected from insects and other pests. The surfactans can include such anionic, non-ionic and cationic agents as have been used heretofore in pesticidal compositions of similar type. A detailed list of such agents is found in "Detergents and Emulsifiers 1967 Annual," (John W. McCutcheon, Inc.).

Anionic and non-ionic surfactants are preferred in formulating compounds of this invention. Among the anionic surfactants, specific preferred ones are alkali and alkaline earth salts of alkylarylsulfonic acids such as dodecylbenzene-sulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isethionate. Among the non-ionic surfactants, preferred ones include octylphenyl polyethylene glycol ether, dodecylphenyl polyethylene glycol ether, sorbitan fatty esters and their polyoxyethylene ethers, polyoxyethylene ethers and thioethers of long-chain alcohols and mercaptans as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants can be used in compositions of this invention in amounts of up to 15% by weight based on the total weight of the resulting insecticidal composition.

Diluents

The compositions of this invention can contain, with or without a surfactant, a finely divided solid diluent such as natural silicates, e.g., talc, sepiolite, pyrophyllite; clays, e.g., montmorillonite, kaolinite, attapulgite; diatomaceous earth, synthetic magnesium silicate, synthetic silicas, calcium silicate, calcium sulfate, calcium carbonate, calcium phosphate and flours derived from natural sources such as walnut shell, redwood, cottonseed, and the like. The finely divided solids can be used in the compositions of this invention at a concentration of 2 to 98% by weight based on the total weight of the resulting pesticidal composition.

These finely divided solid diluents can be used in the preparation of water extendable concentrates containing from 75 to 98% of a compound of this invention; dust-base concentrates of similar strength compounded for easy dilution with dusting diluents; wettable powders containing from 20 to 90% of a compound of this invention; and dusts, usually ranging in active ingredient control from 2 to 25%. Preferred finely divided solid formulations are high-strength compositions and powders containing 2 to 25% of synthetic silica and 75 to 98% active ingredients, with up to approximately 6% of one or more surfactants optionally replacing some silica.

Solvents

Organic liquids which are suitable for the preparation of solutions, suspensions and emulsifiable concentrates of the compounds of this invention include alcohols, glycols, cellosolves, carbitols, ketones, esters, sulfoxides, amides, paraffinic hydrocarbons, aromatic hydrocarbons, and halogenated hydrocarbons. Ordinarily, solvent choice is dictated by the solubility of the active compound to be used and whether a suspension or solution is desired.

Preferred solutions are those containing 5 to 30% active ingredient and 70 to 95% solvent. Preferred solvents are dimethyl formamide and dimethylsulfoxide.

Suspension formulations comprise from 10 to 50% of a compound of this invention dispersed in a non-solvent carrier. Dispersants and suspending agents can be present to improve the handling characteristics of such formulations. Suspension formulations are generally preferred if the solubility of the active ingredient in the liquid carrier is less than about 0.1%. In addition to non-solvent organic carriers, water can be used as a carrier for suspension concentrates of water-insoluble compounds of the invention.

For aerosol formulations low-boiling halogenated hydrocarbons are preferred as solvents and propellants, although they can be partially replaced by low boiling hydrocarbons which acts as propellants. Aerosol formulations ordinarily contain an organic or aqueous liquid in the range of 80 to 98% by weight based on the total weight of the pesticidal composition.

Granules and pellets

Formulations in the form of granules and pellets are physically stable, particulate compositions containing a compound of Formula I which adheres to or is distributed through a basic matrix of a coherent, inert carrier of macroscopic dimensions. In oder to aid leaching of the active ingredient from the granule or pellet, a surfactant can be present.

Suitable carriers are of mineral or organic origin such as natural clays, some pyrophyllites, vermiculite and gypsum or ground nut shell and corncob. Suitable surfactants are anionic or non-ionic.

For the granule compositions of this invention, most suitable carriers are of two types. The first are porous, absorptive, preformed granules, such as preformed and screened granular attapulgite; heat expanded, granular, screened vermiculite; screened nut shell; or granular corncob. On such preformed granules, a solution of the active agent can be sprayed and will be absorbed at concentrations up to 25 weight percent of the total weight. The active agent is preferably applied in a volatile organic solvent when its solubility permits. Ordinarily, if an organic solvent is used, it is preferably selected from among methylene chloride, methyl Cellosolve, dimethyl formamide and the like.

Preformed granules can also be treated with a melt of active ingredient if the active ingredient's melting point is sufficiently below its decomposition temperature. When this means of application is used, the active ingredient in a very finely divided form is deposited on the surface of the granules such as by tumbling in a mixer. The finely divided active agent can if desired contain minor amounts of diluents such as synthetic silicas, natural clays and surface active agents. After the active agent is distributed on the granules the granules are heated to above the melting point of the active agent preferably while tumbling is continued. The granules are then cooled and contain active ingredient within, as well as fixed on, their surfaces.

The second type of carrier suitable for granules as well as pellets is initially in a powder form. Powered kaolin clays, hydrated attapulgite, bentonite clays such as sodium, calcium and magnesium bentonite or gypsum or plaster of Paris are blended with the active ingredient and the mixtures are then granulated or pelleted. Water soluble salts can be included in the compositions to aid in disintegration of the granules and pellets in the presence of moisture. Granules or pellets can be made containing 15 to 30 weight percent of active ingredient, but more frequently a concentration of 2 to 20 percent is preferred for optimum distribution. Such granular compositions are most useful in a size range of 0.25 mm. to 1.4 mm.

The most preferred formulation for granules or pellets is 2 to 20 weight percent active ingredient, 0 to 5 weight percent surfactant and 75 to 98 percent inert mineral carrier.

The above formulations can be prepared by methods generally used for pesticidal compositions of similar type. The solid compositions, with the exception of granules and pellets are prepared in a blending operation and will usually include passage through a grinder such as an attrition mill, a hammer mill or a fluid energy mill.

Solutions are prepared by stirring the combined ingredients; in some cases warming may speed solution and in others cooling or pressure may be required to prevent evaporation of the solvent. Aqueous and oil suspensions are prepared by mixing the insoluble active ingredient and other ingredients and ball milling or sand grinding the mixture to produce a concentrated slurry of very finely divided particles.

Modifiers

Additional modifiers can be used to advantage in the compositions of this invention. Thus, although the compounds of Formula I are quite stable under most conditions, the use of a desiccant, buffering agent or materials such as urea, which inactivate catalytic sites on diluent particles can prove desirable. Additives which will inhibit corrosion, reduce foam, reduce caking and increase flocculation can also be used. In addition, bactericides, fungicides, bacteriostats and fungistats and other insecticides, acaricides and nematocides are often desirably present in the compositions of this invention in amounts of 0.025 to 10 parts by weight for each 1 part by weight of compound of Formula I. Suitable biologically active compounds are well known to those skilled in the art.

Of the biologically active compounds, those which are insecticides and with which compounds of Formula I are preferably combined include EPN; 3-(dimethoxyphosphinyloxy)-N,N-dimethyl-cis-crotonamide ("Azodrin"®);

Gutnim® and endosulfan.

Fungicides and fungistats with which compounds of Formula I are preferably combined include pentachloronitrobenzene (PCNB); thiram; dodine; maneb; methylmercury 2,3-dihydroxypropyl mercaptide; methylmercury acetate; N-ethyl mercury p-toluenesulfonanilide; 1,4-dichloro - 2,5 - dimethoxybenzene; N-trichloromethylthiotetrahydrophthalimide; N - trichloromethylthiophthalimide; sodium and calcium propionate; 3,3'-ethylene-bis-(tetrahydro - 4,6 - dimethyl-2H-1,3,5-thiadiazine-2-thione), and methyl 1-(butylcarbamoyl)-2-benzimidazolecarbamate.

Bacteriostats and bacteriocides with which compounds of Formula I are preferably combined include tribasic copper sulfate and streptomycin sulfate.

Specific combinations which are preferred and their area of exceptional utility include:

(a) Methyl 1 - carbamoyl-N-(methylcarbamoyloxy) formimidate and methyl O-(methylcarbamyl)thioacetohydroxamate in ratios ranging fro 1:4 to 4:1 for use on cotton plants.

(b) Methyl 1-carbamoyl-N-(methylcarbamoyloxy)-formimidate or methyl 1-(dimethylcarbamoyl)-N-(methylcarbamoyloxy)formimidate and 1,4-dichloro-2,5-dimethoxybenzene (chloroneb) in ratios ranging from 1:6 to 6:1 for use on cotton seed. The chloroneb can be replaced in these combinations by one of the following compounds, their mixtures with each other or their mixtures with chloroneb: pentachloronitrobenzene, captan; tetramethylthiuran disulfide; 1-chloro-2-nitropropane; 5-ethoxy - 3-trichloromethyl-1,2,4-thiadiazole; and p-dimethylaminobenzene-diazo sodium sulfonate. Such combinations are useful on seeds other than cotton including both vegetable and agronomic crops.

(c) Methyl 1-carbamoyl - N - (methylcarbamoyloxy) formimidate, chloroneb, and methyl 1-(butylcarbamoyl)-2-benzimidazolecarbamate, in ratios ranging from 1:4:4 to 4:1:1, for use on cotton seed and other crop seed.

(d) Methyl 1-carbamoyl - N - (methylcarbamoyloxy) formimidate and methyl parathion, in ratios ranging from 1:6 to 6:1 for use on cotton plants. In other combinations for this use, the methyl parathion can be replaced by one of the following compounds, their mixtures with each other and their mixtures with methyl parathion; carbaryl; malathion; parathion; and "Guthion"®.

(e) Methyl 1 - carbamoyl - N - (methylcarbamoyloxy) formimidate and methyl 1 - (butylcarbamoyl) - 2 - benzimidazolecarbamate, in ratios ranging from 1:3 to 3:1, for use on rice plants in seedbed, paddy or field for the control of insects and disease.

(f) Methyl 1 - carbamoyl-N-(dimethylcarbamoyloxy) formimidate combined wih EPN, carbaryl, "Guthion"®, malathion, methyl parathion or parathion, in ratios ranging from 1:4 to 4:1, for us on rice plants.

(g) Methyl 1 - carbamoyl - N-(dimethylcarbamoyloxy) formimidate combined with malathion, parathion, diazinon, "Guthion"®, carbaryl or methoxychlor in ratios ranging from 1:5 to 5:1, for use on potato plants or cruciferous crops. The methyl 1-carbamoyl-N-(dimethylcarbamoyloxy)formimidate can be replaced in this combination by other compounds of Formula I such as methyl 1-carbamoyl - N - (methylcarbamoyloxy)formimidate.

(h) Methyl 1 - carbamoyl - N - (methylcarbamoyloxy) formimidate combined with parathion, diazinon or phorate, in ratios ranging from 1:3 to 3:1 for application to soil prior to or during the planting of corn. The methyl 1-carbamoyl-N-(methylcarbamoyloxy)formimidate can be replaced in this combination by other compounds of Formula I such as methyl 1-carbamoyl-N-(dimethylcarbamoyloxy)formimidate.

(i) Methyl 1 - carbamoyl - N - (methylcarbamoyloxy) formimidate combined with methoxychlor, malathion, parathion, lead arsenate, "Guthion"®, or carbaryl in ratios ranging from 1:4 to 4:1, for use on apples and other crops.

(j) Methyl 1 - carbamoyl - N-(dimethylcarbamoyloxy) formimidate combined with carbaryl, EPN, methoxychlor or diazinon, in ratios ranging from 1:5 to 5:1 for use on corn plants.

(k) Methyl 1 - carbamoyl - N - (methylcarbamoyloxy) formimidate combined with "Guthion"®, malathion, diazinon, parathion or carbaryl, in ratios ranging from 1:6 to 6:1, for use on tobacco plants in seedbed or field.

(l) Methyl 1 - carbamoyl - N-(dimethylcarbamoyloxy) formimidate and chlordane, in ratios ranging from 1:8 to 8:1, for use on sugarcane seed pieces in the furrow at the time of planting.

(m) Methyl 1 - carbamoyl - N-(methylcarbamoyloxy) formimidate combined with toxaphene, carbaryl, endrin, or "Guthion"®, in ratios ranging from 1:12 to 12:1, for use on sugarcane foliage.

(n) Methyl 1-carbamoyl-N-(dimethylcarbamoyloxy) formimidate combined with methoxychlor, carbaryl, or malathion, in ratios ranging from 1:4 to 4:1, for use on shade trees or forest lands.

(o) Methyl 1 - carbamoyl - N-(methylcarbamoyloxy) formimidate combined with diazinon or parathion, in ratios ranging from 1:5 to 5:1, for use in soil prior to or during planting of potatoes.

The use of pesticides, such as those mentioned above, in combination with the compounds of Formula I sometimes offers an unexpected degree of plant protection. This is especially true when the compounds of Formula I are combined with a fungicide and applied to the locus of a plant where both plant-parasitic nematodes and fungi are present. Thus, the combination of the compounds of Formula I with pesticides such as 1,4-dichloro-2,5-dimethoxy benzene, and 1,2-dibromo-3-chloropropane are particularly preferred combinations.

APPLICATION

In applying the compounds of Formula I for pest control, the compound is of course applied in an amount sufficient to exert the desired pesticidal action. The amounts required to give pest control action however are governed by such variables as temperature, time of the year, moisture, type of application, pest species to be controlled and the like. Thus it is not possible to state any one method or rate of application which would be generally satisfactory. It is possible however to describe generally some of the various methods and rates of application for certain areas of use and to which the compounds of Formula I are best suited.

Thus, the compounds of Formula I can be used to control plant-predacious insects and mites by distributing the chemical over those plant surfaces which are infested or which are to be protected from subsequent infestation. Due to their low order of phytotoxicity the compounds of Formula I can be applied without fear of damage to the plant when used as directed. Use rates for this type of application are in the range of 0.05 to 34 kilograms of active ingredient per hectare. Rates of 0.1 to 17 kilograms per hectare are preferred and rates of 0.2 to 8 kilograms per hectare are most preferred for reasons of convenience and economy. This type of application may need to be repeated at intervals of 3 to 20 days. Such applications can be made with any of a variety of widely available types of equipment ordinarily used for such applications.

Other effective methods of application include:

(a) To the seed of agricultural, horticultural and ornamental crops to protect the seed during storage and shipping prior to planting as well as to protect the seed and seedlings from attack by insects and mites after planting. The preferred rates for application to seed are in the range of 0.06 gram to 3 kilograms of the active compound of this invention per 100 kilograms of seed. The most preferred rates are in the range of 0.6 to 600 grams per 100 kilograms of seed.

(b) To soil in which plants are to be planted or are growing to protect seed and plants from attack by insects and mites. Such protection is against both soil insects attacking the roots and insects and mites attacking the above-ground parts of the plants. Preferred use rates are in the range of 0.1 to 60 kilograms of active ingredient per hectare treated. The most preferred rates are in the range of 0.3 to 20 kilograms per hectare.

(c) To the walls and floors of structures such as warehouses, stores, recreation buildings, factories, homes, poultry houses and barns to control insects, ticks and mites which could damage contents as well as attack or annoy people or domestic animals. Applications to be repeated as needed.

(d) To insects, ticks and mites that cause injury or annoyance, or carry disease to animals. The compounds of this invention can be applied to the animals to be protected by sprays, dusts or dips in such a way as to give a more or less uniform coating. Applications to be repeated as needed.

(e) To land areas (including marsh or swamp) for the control of insects, ticks, or mites causing injury or annoyance or disseminating disease to humans or animals. Preferred use rates are in the range of 0.01 to 10 kilograms of active compound of this invention per hectare 1 to 5 times a year. The most preferred rates are in the range of .03 to 3 kilograms of active compound per hectare on the same schedule.

The compounds of Formula I are also well suited to the control of plant-parasitic nematodes inhabiting soil in which the plants are planted or are to be planted. The physical characteristics of the compounds of Formula I permit them to be placed readily at the site of nematode presence or activity without disturbing already established plants. The physical nature of the compounds of Formula I permit their movement deep into undisturbed soil around plant roots, often the site of nematode attack. The safety margin for plants make practical such application as well as application to soil being prepared for planting and application directly to seeds and growing plants at rates well above those required to control the nematodes.

Use rates for application to soil in which plants are growing are generally the same as those for application to soil being prepared for planting. Such rates range from about 0.15 to 225 kilograms of active ingredient per hectare of surface actually treated. Rates of 0.25 to 55 kilograms per hectare are most preferred for these uses for reasons of convenience and economy.

Other methods of applying the compounds of Formula I to prevent the destructive effects of plant-parasitic nematodes include: spraying above-ground parts such as stems, leaves or buds in which nematodes are already present or where later attack is possible; dipping or soaking reproductive parts such as seeds, cane pieces or bulbs (which are already infested or are to be planted in infested soil) in a water suspension, solution or emulsion of the active ingredient; or immersing the root system or the entire plant of nursery stock or transplants in a water system to disinfect them or provide protection against subsequent nematode invasion. The rates of active ingredient in the sprays or dips used as noted just above are 12 grams to 4.8 kilograms per 100 liters of water. Preferred rates are in the range of 30 grams to 1.2 kilograms per 100 liters.

In all of the applications discussed above, the distribution of the compounds of this invention may be simplified and made more accurate and economical by use of formulations as discussed previously.

The following examples further illustrate this invention. Parts and percentages referred to in the examples are by weight unless otherwise noted.

EXAMPLE 1

Methyl 1-(dimethylcarbamoyl)-N-(methylcarbamoyloxy)formimidate

Part A

To a solution of 20 parts of 1-(dimethylcarbamoyl)-formhydroxyamyl chloride in 1000 parts of methanol at −70° C. to 80° C. is added dropwise over 15-25 minutes a solution of 14.4 parts of sodium methoxide in 250 parts of methanol. The methanolic solution is allowed to warm to room temperature and is evaporated under reduced pressure. The residue is taken up in water and the resulting aqueous solution is washed thoroughly with methylene chloride and filtered through a darco pad to remove impurities. The aqueous solution is neutralized with dilute hydrochloric acid and allowed to evaporate. The resulting solid is extracted with a boiling solution of ethyl acetate/acetonitrile which is then filtered through a darco pad. Evaporation of the organic solvent under reduced pressure furnishes the solid methyl 1 - (dimethylcarbamoyl)-N-hydroxyformimidate which is recrystallized from ethyl acetate/acetonitrile in the form of long, white needles, M.P. 157.5–159.5°.

Part B

To a suspension of 8.75 parts of methyl 1-(dimethylcarbamoyl)-N-hydroxyformimidate and 3 drops of triethylamine in 100 parts of acetone at room temperature is added 4 parts of methyl isocyanate. The reaction is allowed to stir overnight and is then evaporated under reduced pressure. The nearly pure product is recrystallized from ethyl acetate/hexane to furnish the methyl 1-(dimethylcarbamoyl)-N-(methylcarbamoyloxy)formimidate as a white solid, M.P. 79–79.5° C.

The compounds of the fourth column of Table I are prepared according to the procedures of Example 1 using the alkoxides of the alcohols listed in the first column, the 1-(carbamoyl)formhydroxamyl chlorides listed in the second column, and the isocyanates listed in the third column. All of the alkoxides used are prepared from the alcohols listed and either potassium, sodium, lithium, or cesium.

EXAMPLE 2

Ethyl-2-(dimethylcarbamoyl)-N-(carbamoyloxy) formimidate

Part A

Replacing the sodium methoxide and methanol in Example 1, part A, with 18 parts of sodium ethoxide and ethanol as the solvent one similarly obtains ethyl 1-(dimethylcarbamoyl)-N-hydroxyformimidate.

Part B

To a solution of 7.2 parts of ethyl 1-(dimethylcarbamoyl)-N-hydroxyformimidate in 100 parts of water at 0–10° C. is added slowly and simultaneously over several hours 3.25 parts sodium cyanate and 5 parts of concentrated hydrochloric acid. The product is extracted with methylene chloride, dried, and evaporated under reduced pressure to furnish ethyl 1-(dimethylcarbamoyl)-N-(carbamoyloxy)formimidate.

The compounds of the right-hand column of Table II are prepared according to the procedure of Example 2, part B, using 1-carbamoyl-N-hydroxyformimidates listed in the left-hand column in place of ethyl 1-(dimethylcarbamoyl)-N-hydroxyformimidate.

EXAMPLE 3

Methyl 1-(carbamoyl)-N-(dimethylcarbamoyloxy) formimidate

Part A

Replacing the 1-(dimethylcarbamoyl)formhydroxyamyl chloride of Example 1, Part A, with 8.1 parts of 1-(carbamoylformhydroxyamyl chloride one similarly obtains methyl 1-(carbamoyl)-N-hydroxyformimidate.

Part B

To a suspension of 10.6 parts of methyl 1-(carbamoyl)-N-hydroxyformimidate in 100 ml. of dioxane is added slowly 2.4 parts of sodium hydride. Rapid evolution of hydrogen is noted as a dense grey precipitate forms. The suspension is then refluxed for 1 hour followed by the dropwise addition of 10.2 parts of dimethylcarbamyl chloride. When the exothermic addition is complete the reaction is stirred at reflux for 1 hour. After cooling, the precipitate is filtered and washed with ether. The ether washings are combined with the filtrate and are evaporated under reduced pressure to afford the methyl 1-(carbamoyl)-N-(dimethylcarbamoyloxy)formimidate.

The compounds of the last column of Table III are prepared by the procedure of Example 3, Part B, using the 1-carbamoyl-N-hydroxyformimidates and carbamoyl chlorides listed in the first and second columns in place of methyl 1-(carbamoyl) - N - hydroxyformimidate and dimethylcarbamoyl chloride.

TABLE I

| Alcohol | 1-carbamoyl formhydroxamyl chloride | Isocyanate | Product |
| --- | --- | --- | --- |
| 2-methoxyethanol | 1-(methylcarbamoyl) formhydroxamyl chloride. | Methyl isocyanate | 2-methoxyethyl 1-(methylcarbamoyl)-N-(methylcarbamoyloxy)formimidate. |
| Methyl alcohol | 1-(butylcarbamoyl) formhydroxamyl chloride. | do | Methyl 1-(butylcarbamoyl)-N-(methylcarbamoyloxy) formimidate. |
| Isopropyl alcohol | 1-(cyclopropylcarbamoyl) formhydroxamyl chloride. | do | Isopropyl 1-(cyclopropylcarbamoyl)-N-(methylcarbamoyloxy)formimidate. |
| Allyl alcohol | 1-(N-methoxy-N-methylcarbamoyl) formhydroxamyl chloride. | Ethylisocyanate | Allyl 1-(N-methoxy-N-methylcarbamoyl)-N-(ethylcarbamoyloxy)formimidate. |
| Butyl alcohol | 1-(allylcarbamoyl) formhydroxamyl chloride. | do | Butyl 1-(allylcarbamoyl)-N-(ethylcarbamoyloxy) formimidate. |
| Methyl alcohol | 1-(diallylcarbamoyl) formhydroxamyl chloride. | Allyl isocyanate | Methyl 1-(diallylcarbamoyl)-N-(allylcarbamoyloxy) formimidate. |
| Ethyl alcohol | 1-(isopropylcarbamoyl) formhydroxamyl chloride. | do | Ethyl 1-(isopropylcarbamoyl)-N-(allylcarbamoyloxy) formimidate. |
| Methyl alcohol | 1-(ethylcarbamoyl) formhydroxamyl chloride. | Propargyl isocyanate | Methyl 1-(ethylcarbamoyl)-N-(propargylcarbamoyloxy) formimidate. |
| Do | 1-(dibutylcarbamoyl) formhydroxamyl chloride. | Methyl isocyanate | Methyl 1-(dibutylcarbamoyl)-N-(methylcarbamoyloxy) formimidate. |
| Do | 1-(diisopropylcarbamoyl) formhydroxamyl chloride. | do | Methyl 1-(diisopropylcarbamoyl)-N-(methylcarbamoyloxy)formimidate. |
| 2-chloroethanol | 1-(but-2-enylcarbamoyl) formhydroxamyl chloride. | Isopropyl isocyanate | 2-chloroethyl 1-(but-2-enylcarbamoyl)-N-(Isopropyl carbamoyloxy)formimidate. |
| Methyl alcohol | 1-(aziridinocarbonyl) formhydroxamyl chloride. | Methyl isocyanate | Methyl 1-(aziridinocarbonyl)-N-(methylcarbamoyloxy) formimidate. |
| 2,2,2-trichloroethanol | 1-(hexahydroazepinocarbonyl) formhydroxamyl chloride) | do | 2,2,2-trichloroethyl 1-(hexahydroazepinocarbonyl)-N-(methylcarbamoyloxy)-formimidate. |
| Methyl alcohol | 1-(pyrrolidinocarbonyl) formhydroxamyl chloride. | do | Methyl 1-(pyrrolidinocarbonyl)-N-(methylcarbamoyloxy) formimidate. |
| Do | 1-(methylcarbamoyl) formhydroxamyl chloride. | Allyl isocyanate | Methyl 1-(methylcarbamoyl)-N-(allycarbamoyloxy) formimidate. |
| Do | 1-(dimethylcarbamoyl) formhydroxamyl chloride. | Propargyl isocyanate | Methyl 1-(dimethylcarbamoyl)-N-(propargylcarbamoyloxy)formimidate. |
| Do | 1-(allylcarbamoyl) formhydroxamyl chloride. | do | Methyl 1-(allylcarbamoyl)-N-(propargylcarbamoyloxy) formimidate. |
| Do | 1-(N-methoxy-N-methylcarbamoyl) formydroxamyl chloride. | Ethyl isocyanate | Methyl 1-(N-methoxy-N-methylcarbamoyl)-N-(ethylcarbamoyloxy)formimidate. |
| Do | 1-(N-methyl-N-ethylcarbamoyl) formhydroxamyl chloride. | Allyl isocyanate | Methyl 1-(N-methyl-N-ethylcarbamoyl)-N-(allylcarbamoyloxy)formimidate. |
| Ethyl alcohol | 1-(piperidinocarbonyl) formhydroxamyl chloride. | do | Ethyl 1-(piperidinocarbonyl)-N-(allylcarbamoyloxy) formimidate. |
| Do | do | Butyl isocyanate | Ethyl 1-(piperidinocarbonyl)-N-(butylcarbamoyloxy) formimidate. |
| Butyl alcohol | do | Methyl isocyanate | Butyl 1-(piperidinocarbonyl)-N-(methylcarbamoyloxy) formimidate. |
| Do | do | Butyl isocyanate | Butyl 1-(piperidinocarbonyl)-N-(butylcarbamoyloxy) formimidate. |
| Methyl alcohol | 1-(N-methyl-N-butylcarbamoyl) formhydroxamyl chloride. | Methyl isocyanate | Methyl 1-(N-methyl-N-butylcarbamoyl)-N-(methylcarbamoyloxy)formimidate. |
| Do | 1-(N-methyl-N-allylcarbamoyl) formhydroxamyl chloride. | do | Methyl 1-(N-methyl-N-allylcarbamoyl)-N-(methylcarbamoyloxy)formimidate. |
| β-aminoethanol | 1-(dimethylcarbamoyl) formhydroxamyl chloride. | do | β-aminoethyl 1-(dimethylcarbamoyl)-N-(methylcarbamoyloxy)formimidate. |
| β-(N,N-dimethylamino) ethanol. | 1-(carbamoyl) formhydroxamyl chloride. | do | β-(N,N-dimethylamino)ethyl 1-(carbamoyl)-N-(methylcarbamoyloxy)formimidate. |
| α-cyanobutanol | 1-(dimethylcarbamoyl)formhydroxamyl chloride. | do | α-cyanobutyl 1-(dimethylcarbamoyl)-N-(methylcarbamoyloxy)formimidate. |
| β-(methylthio)-ethanol | 1-(cyclopentylcarbamoyl)formhydroxamyl chloride. | do | β-(methylthio)ethyl 1-(cyclopentylcarbamoyl)-N-(methylcarbamoyloxy)formimidate. |
| β-nitroethanol | 1-(methylcarbamoyl) formhydroxamyl chloride. | do | β-nitroethyl 1-(methylcarbamoyl)-N-(methylcarbamoyloxy)formimidate. |
| β-cyanoethanol | 1-(dimethylcarbamoyl)formhydroxamyl chloride. | do | β-cyanoethyl 1-(methylcarbamoyl)-N-(methylcarbamoyloxy)formimidate. |

TABLE I—Continued

| Alcohol | 1-carbamoyl formhydroxamyl chloride | Isocyanate | Product |
|---|---|---|---|
| Methyl α-hydroxybutyrate | 1-(ethylcarbamoyl)formhydroxamyl chloride | Ethyl isocyanate | 1-(methoxycarbonoyl)propyl 1-(ethylcarbamoyl)-N-(ethylcarbamoyloxy)formimidate. |
| Ethylene glycol | 1-(dimethylcarbamoyl)formhydroxamyl chloride | Methyl isocyanate | β-hydroxyethyl 1-(dimethylcarbamoyl)-N-(methylcarbamoyloxy)formimidate. |
| β-methylthioethanol | do | do | β-methylthioethyl 1-(dimethylcarbamoyl)-N-(methylcarbamoyloxy)formimidate. |
| Glycidol | do | do | Glycidyl 1-(dimethylcarbamoyl)-N-(methylcarbamoyloxy)formimidate. |
| Cyclohexanol | 1-(propylcarbamoyl)formhydroxamyl chloride | do | Cyclohexyl 1-(propylcarbamoyl)-N-(methylcarbamoyloxy)formimidate. |
| Cyclopropanol | 1-(methylcarbamoyl)formhydroxamyl chloride | do | Cyclopropyl 1-(methylcarbamoyl)-N-(methylcarbamoyloxy)formimidate. |
| Propargyl alcohol alcohol | do | do | Propargyl 1-(methylcarbamoyl)-N-(methylcarbamoyloxy)formimidate. |
| 3-butynyl alcohol | 1-(dimethylcarbamoyl)formhydroxamyl chloride | do | 3-butynyl 1-(dimethylcarbamoyl)-N-(methylcarbamoyloxy)formimidate. |
| Gamma-ethoxypropanol | do | do | Gamma-ethoxypropyl 1-(dimethylcarbamoyl)-N-(methylcarbamoyloxy)formimidate. |

TABLE II

| 1-carbamoyl N-hydroxyformimidate | Product |
|---|---|
| Methyl 1-(carbamoyl)-N-hydroxyformimidate. | Methyl 1-(carbamoyl)-N-(carbamoyloxy)formimidate. |
| Methyl 1-(methylcarbamoyl)-N-hydroxyformimidate. | Methyl 1-(methylcarbamoyl)-N-(carbamoyloxy)formimidate. |
| Methyl 1-(dimethylcarbamoyl)-N-hydroxyformimidate. | Methyl 1-(dimethylcarbamoyl)-N-(carbamoyloxy)formimidate. |
| Methyl 1-(diethylcarbamoyl)-N-hydroxyformimidate. | Methyl 1-(diethylcarbamoyl)-N-(carbamoyloxy)formimidate. |
| Ethyl 1-(methylcarbamoyl)-N-hydroxyformimidate. | Ethyl 1-(methylcarbamoyl)-N-(carbamoyloxy)formimidate. |
| Methyl 1-(N-methyl-N-ethylcarbamoyl)-N-hydroxyformimidate. | Methyl 1-(N-methyl-N-ethylcarbamoyl-N-(carbamoyloxy)formimidate. |
| Methyl 1-(piperidinocarbonyl)-N-hydroxyformimidate. | Methyl 1-(piperidinocarbonyl)-N-(carbamoyloxy)formimidate. |
| Allyl 1-(dimethylcarbamoyl)-N-hydroxyformimidate. | Allyl 1-(dimethylcarbamoyl)-N-(carbamoyloxy)formimidate. |
| Propyl 1-(dimethylcarbamoyl)-N-hydroxyformimidate. | Propyl 1-(dimethylcarbamoyl)-N-(carbamoyloxy)formimidate. |
| β-Cyanoethyl 1-(dimethylcarbamoyl)-N-hydroxyformimidate. | β-Cyanoethyl 1-(dimethylcarbamoyl)-N-(carbamoyloxy)formimidate. |
| Propargyl 1-(dimethylcarbamoyl)-N-hydroxyformimidate. | Propargyl 1-(dimethylcarbamoyl)-N-(carbamoyloxy)formimidate. |
| Methyl 1-(N-methyl-N-methoxycarbamoyl)-N-hydroxyformimidate. | Methyl 1-(N-methyl-N-methoxycarbamoyl)-N-(carbamoyloxy)formimidate. |
| Methyl 1-(aziridinocarbonyl)-N-hydroxyformimidate. | Methyl 1-(aziridinocarbonyl)-N-(carbamoyloxy)formimidate. |
| Methylthiomethyl 1-(dimethylcarbamoyl)-N-hydroxyformimidate. | Methylthiomethyl 1-(dimethylcarbamoyl)-N-(carbamoyloxy)formimidate. |
| β-Trichloroethyl 1-(dimethylcarbamoyl)-N-hydroxyformimidate. | β-Trichloroethyl 1-(dimethylcarbamoyl)-N-(carbamoyloxy)formimidate. |
| Butyl 1-(dimethylcarbamoyl)-N-hydroxyformimidate. | Butyl 1-(dimethylcarbamoyl) N-(carbamoyloxy)formimidate. | in the spray tank. Then, as these solutions dry out on foliage the crystalline form may be restored. It is often advantageous to inhibit or control crystal growth during the drying step, so that the active ingredient remains in finely divided form. In other cases, larger crystals do not appear to diminish insecticidal activity.

EXAMPLE 4

| | Percent |
|---|---|
| Methyl-carbamoyl - N - (methylcarbamoyloxy)form imidate | 95 |
| Synthetic fine silica | 5 |

A screened fraction of active materials of less than 60 mesh is blended with fine silica to prevent agglomeration in storage. When added to water this crystalline form disperses satisfactorily without lumping and dissolves within a few minutes.

This formulation is dissolved in water and applied with conventional spray equipment at a concentration of 120 grams of formulation to 100 liters of water and a rate of 2.5 kilograms of active ingredient per hectare to bush snap beans being attacked by Mexican bean beetle (*Epilachna varivestis*) and the two-spotted mite (*Tetranychus urticae*). The treated bean plants make rapid growth, have deep green leaves without the chewed areas characteristic of bean beetle attack, and produce a good yield of snap beans. In an untreated area nearby, bean plants are stunted, have chlorotic and netted leaves and produce a poor crop.

TABLE III

| 1-carbamoyl N-hydroxyformimidate | Carbamoyl chloride | Product |
|---|---|---|
| Methyl 1-carbamoyl-N-hydroxyformimidate | N-allyl-N-methylcarbamoyl chloride | Methyl 1-carbamoyl-N-(N-allyl-N-methylcarbamoyloxy)formimidate. |
| Do | N-methyl-N-propargylcarbamoyl chloride. | Methyl 1-carbamoyl-N-(N-methyl-N-propargylcarbamoyloxy)formimidate. |
| Do | N-methyl-N-propylcarbamoyl chloride. | Methyl 1-carbamoyl-N-(N-methyl-N-propylcarbamoyloxy)formimidate. |
| Do | N-ethyl-N-methylcarbamoyl chloride | Methyl 1-carbamoyl-N-(N-ethyl-N-methylcarbamoyloxy)formimidate. |
| Methyl 1-methylcarbamoyl-N-hydroxyformimidate | Dimethylcarbamoyl chloride | Methyl 1-(methylcarbamoyl)-N-(dimethylcarbamoyloxy)formimidate. |
| Methyl 1-dimethylcarbamoyl-N-hydroxyformimidate. | do | Methyl 1-(dimethylcarbamoyl)-N-(dimethylcarbamoyloxy)formimidate. |
| Methyl 1-cyclopentylcarbamoyl-N-hydroxyformimidate. | do | Methyl 1-(cyclopentylcarbamoyl)-N-(dimethylcarbamoyloxy)formimidate. |
| Propyl 1-carbamoyl-N-hydroxyformimidate | do | Propyl 1-carbamoyl-N-(dimethylcarbamoyloxy)formimidate. |
| Ethyl 1-carbamoyl-N-hydroxyformimidate | do | Ethyl 1-carbamoyl-N-(dimethylcarbamoyloxy)formimidate. |
| Butyl 1-carbamoyl-N-hydroxyformimidate | do | Butyl 1-carbamoyl-N-(dimethylcarbamoyloxy)formimidate. |
| Methyl 1-piperdinocarbonyl-N-hydroxyformimidate | do | Methyl 1-piperidinocarbonyl-N-(dimethylcarbamoyloxy)formimidate. |
| Allyl 1-carbamoyl-N-hydroxyformimidate | do | Allyl 1-carbamoyl-N-(dimethylcarbamoyloxy)formimidate. |
| But-2-enyl 1-carbamoyl-N-hydroxyformimidate | do | But-2-enyl 1-carbamoyl-N-(dimethylcarbamoyloxy)-formimidate. |

The following examples illustrate formulations of compounds of the invention and methods of applying the formulations to protect plants.

(A) Water-soluble powders

It is possible to prepare wettable powders which become solutions rather than dispersions of active material Methyl 1 - (dimethylcarbamoyl)-N-(methylcarbamoyloxy)-formimidate formulated in the same manner as above and used in tobacco transplant water at the rate of 15 milligrams of active ingredient per plant, protects the tobacco plants from nematode attack resulting in rapid growth and good tobacco yield.

EXAMPLE 5

The water-soluble powder formulation of Example 4 is dissolved at the rate of 80 milligrams per liter of water and is used as transplant water in the amount of 235 milliliters for each tobacco plant being set in a field that is infested with the southern root-knot nematode (*Meloidogyne incognita*), the stunt nematode (*Tylenchorhynchus claytoni*), the lesion nematode (*Pratylenchus brachyurus*) and tobacco wireworm (*Conoderus vespertinus*). The treated tobacco plants develop an extensive root system essentially free of root-knot, make rapid growth and yield well. Tobacco not so treated grows slowly and produces little marketable leaf.

EXAMPLE 6

The formulation of Example 4 with methyl 1-(dimethylcarbamoyl) - N - (methylcarbamoyloxy)formimidate as the active ingredient is dispersed in water and used to treat sugarcane seed pieces being planted in muck soil in Florida so that the formulation is used at the rate of 3.5 kilograms of active ingredient per hectare of planted cane. The young plants are protected from the attack of the stunt nematode (*Tylenchorhynchus martini*) and make rapid growth compared to seedlings not protected in this manner.

EXAMPLE 7

The formulation of Example 4 with methyl 1-(dimethylcarbamoyl)-N-(methylcarbamoyloxy)formimidate as the active ingredient is sprayed on an alfalfa field infested with the alfalfa stem nematode (*Ditylenchus dipsaci*) at the rate of 1.25 kilograms of active ingredient per hectare in a volume of 60 liters per hectare. The treated alfalfa plants make rapid growth and produce deep green foliage while the plants in a nearby untreated area produce distorted growing tips and stems which are easily broken by the wind and have yellowish top growth.

EXAMPLE 8

The formulation of Example 4 with methyl carbamoyl) - N - (methylcarbamoyloxy)formimidate as the active ingredient is sprayed around young, bearing citrus trees in Florida in a grove infested with the burrowing nematode (*Radopholus similis*). The material is applied at a rate of 4.5 to 9 kilograms of active ingredient per hectare and washed into the soil with overhead irrigation. This application is repeated at three month intervals for a total of 3 applications. The trees are protected from burrowing nematodes, make rapid growth and bear a heavy crop of fruit. Citrus trees in a nearby grove not protected in this manner show a gradual decline in vigor and produce a light crop of fruit.

(B) Wettable powders

EXAMPLE 9

| | Percent |
|---|---|
| Methyl 1-(dimethylcarbamoyl)-N-(methylcarbamoyloxy)formimidate | 95 |
| Synthetic fine silica | 5 |

The active ingredient is blended with the silica to give a stable easily dispersible water soluble formulation.

(A) Four kilograms (active) of the above formulation is stirred into 1000 liters of water and sprayed over a one hectare cultivated field. The field is disked lightly and then planted to peanuts. The peanuts germinate and grow well, free from the interference of nematodes and early season insects. At the time of pegging, the field is again sprayed with three kilograms (active) of the formulation in 750 liters of water. These two treatments give excellent control of insects such as thrips and southern corn rootworm and nematodes such as *Meloidogyne incognita*, *Meloidogyne hapla*, and *Belonolaimus* spp.

(B) One-half kilogram (active) of the above formulation is stirred into 400 liters of water and sprayed over a 1 hectare field of alfalfa when injury to the crop by insects is in evidence. Excellent control of the alfalfa weevil is obtained and a high yield of alfalfa is gathered at cropping time. The treated plants make rapid growth and produce deep green foliage while the plants in a nearby untreated area produce distorted growing tips and stems which are easily broken by the wind. These plants also have yellowish top growth and some whitish foliage due to insect feeding. In many instances a single spray will protect the crop from the alfalfa weevil for the entire season. However, when the season is long and several cuttings are made, additional sprays may be needed.

(C) Two kilograms (active) of the above formulation is stirred into 200 liters of water and applied to a one hectare cultivated field by spraying into a furrow behind a 30 cm. cultivator tooth 10 cm. deep. Soybeans are then planted in the furrow. This treatment gives excellent control of *Heterodera glycine*, a parasitic nematode of soybeans. Control of the nematode gives rise to larger, healthier plants and a higher yield of soybeans.

(D) Four kilograms (active) of the above formulation is stirred with 1000 liters of water and sprayed over a hectare area of grapes when the vines are well leafed-out in the spring. A second application is applied three weeks later. The vines grow well, free from attack by nematodes such as *Meloidogyne* spp. and *Xiphinema*, and insects such as *Phylloxera* and grape mealy bugs.

(E) Lettuce seed is treated with the above formulation at the rate of 1 part of the active ingredient to 200 parts of the seed. When the plants which are grown from the treated seed are about 3 cm. high, a spray application is made to the foliage at the rate of 2 kg./ha. (active) in 500 liters of water. A similar spray application is again made 2 weeks later in the season. Such treatments give excellent control of insects such as leaf hoppers, lygus bugs, and aphids. In addition, excellent control of nematodes such as *Meloidogyne hapla* and *Pratylenchus* spp. is also obtained. Much higher yield of high quality lettuce is produced from fields treated in this fashion than from similar but untreated lettuce fields.

EXAMPLE 10

| | Percent |
|---|---|
| Methyl 1 - carbamoyl-N-(methylcarbamoyloxy)formimidate | 75 |
| Alkyl naphthalene sulfonic acid, Na salt | 1 |
| Partially desulfonated sodium lignin sulfonate | 10 |
| Synthetic fine silica | 14 |

The above components are blended, micropulverized and then air-milled. When used in low volumes of water the active ingredient which fails to dissolve remains dispersed as a fine suspension. In larger volumes it all dissolves, but upon drying on foliage the crystal size is controlled by the lignin sulfonate present.

This formulation is dispersed in water and sprayed by means of a tractor-mounted sprayer at a rate of about 1.5 kilograms of active ingredient in 50 liters of water per hectare of cotton. Applications are made on a weekly schedule and finally on a five-day schedule during the latter part of the growing season. The treated cotton is protected from attacking boll weevil (*Anthonomous grandis*) and the bollworm complex including *Heliothis zea* and *Heliothis virescens*. The developing squares and bolls are retained by the plants, and a good yield of cotton fiber is obtained at the end of the season. In a nearby untreated field, the fruit set is markedly reduced by the several pests, and the yield of cotton is greatly reduced.

Even much higher rates than those given above can be used with complete safety to the cotton plants. If infestations are very severe, better control can be obtained by combining the compound of this invention with one of the following: DDT, carbaryl, dimethyl parathion or "Azodrin"®.

The same composition can be used to formulate:

methyl 1-carbamoyl-N-(dimethylcarbamoyloxy) formimidate
ethyl 1-carbamoyl-N-(methylcarbamoyloxy) formimidate
ethyl 1-carbamoyl-N-(dimethylcarbamoyloxy) formimidate

EXAMPLE 11

The formulation of Example 10 is dispersed in water and sprayed at the rate of 10 kilograms of active ingredient in 200 dekaliters of water per hectare of a Zoysia lawn in Florida where the soil is heavily infested with sting nematode (*Belonolaimus longicaudatus*) and lance nematode (Hoplolaimus spp.). After spraying, the material is washed into the ground with the equivalent of about 1200 dekaliters of water per hectare. The grass in the treated area develops a deep root system and makes rapid growth, whereas grass in a similar but untreated area grows slowly and develops a shallow root system.

Methyl 1-(dimethylcarbamoyl, - N - (methylcarbamoyloxy)formimidate is formulated as in Example 10 and applied to another plot of Zoysia lawn in Florida similarly infested with nematodes. The formulation is applied in the same manner as above but at a rate of only 2.5 kilograms of active ingredient in 200 dekaliters of water per hectare. The lawn thus treated exhibits similar beneficial effects to those described above.

EXAMPLE 12

For the simultaneous control of the root knot nematode and soil fungi as represented by Pythium spp. and Rhizoctonia spp., the wettable powder formulation of Example 10 is applied in a spray which also contains 1,4-dichloro-2,5-dimethoxybenzene. For this type of application, 2.4 kilograms active of the compound of this invention and 4.8 kilograms active of 1,4-dichloro-2,5-dimethoxybenzene is added to 100 liters of water. This mixture is applied as a soil spray by application to a 25 centimeter band over the row in which cotton is to be planted. The application rate in the row is 67.5 kilograms of total active (22.5 kilograms of the compound of this invention and 45 kilograms of 1,4-dichloro-2,5-dimethoxybenzene) per hectare of area actually treated. The soil is rotovated immediately thereafter to mix the chemicals thoroughly with the soil. Following this, cotton seed is planted in the treated band. The cotton seedlings which develop are protected against root knot nematode (*Meloidogyne incognita*), the reniform nematode (*Rotylenchulus reinformus*) and the fungi Pythium spp. and Rhizoctonia spp. A healthy stand of cotton plants is obtained and at harvest time, a high yield of cotton. Where no treatment is applied, the stand is poor, growth is slow and lint yield is reduced.

Methyl 1-(dimethylcarbamoyl) - N-(methylcarbamoyloxy)formimidate is formulated as in Example 10 and is applied in a spray along with 1,4-dichloro-2,5-dimethoxybenzene to soil prior to planting with cotton seed in the manner described above. The application rate in the row is 6 kilograms of the compound of this invention and 45 kilograms of 1,4-dichloro-2,5-dimethoxybenzene per hectare of area actually treated. The soil is rotovated immediately thereafter to mix the chemicals thoroughly with the soil. Cotton seed is planted in the treated band. Cotton seedlings are protected from root-knot and reniform nematodes as well as the attack of Pythium and Rhizoctonia fungi. The plants develop an extensive deep root system and make rapid growth.

Even much higher use rates than those given above can be employed with complete safety to the cotton plants.

EXAMPLE 13

The formulation of Example 10 is added to water in an amount to give 45 grams of active ingredient per 100 liters of spray. This solution-dispersion is sprayed on apple trees to the point of run-off by means of a high pressure hydraulic sprayer. Sprays on a weekly schedule provide control of green apple aphid, codling moth, plum curculio and redbanded leaf roller. One or more of the following insecticides in effective amounts can be added to the spray when a longer interval between applications is desired or it is needed to control other especially difficult-to-control pests: DDT, methoxychlor, malathion, lead-arsenate, "Guthion"®, or carbaryl.

EXAMPLE 14

The wettable powder formulation of Example 10 is dispersed in water and sprayed by means of a conventional sprayer over a lawn and adjacent vegetation infested with the American dog tick (*Dermacentor variabilis*). An amount of the formulation is used to give 6 kilograms of 800 liters of water per hectare of area sprayed which effectively controls the pest.

EXAMPLE 15

The formulation of Example 10 is dispersed in water, and drenched on the soil over the root zone of boxwood plants infested with the spiral nematode (*Helicotylenchus buxophilus*) at a rate of 3.5 kilograms of active agent per hectare of area treated using enough eater to wash the active agent down about the plant roots. Substantially all spiral nematodes are controlled by this treatment, allowing the boxwood plant to develop in a normal manner. Similarly infested boxwood plants which are left untreated grow poorly and finally die.

EXAMPLE 16

| | Percent |
|---|---|
| n-Propyl-1-carbamoyl - N - (methylcarbamoyloxy) formimidate | 50 |
| Dioctylsodium sulfosuccinate | 1.5 |
| Low viscosity methylcellulose | 2.0 |
| Diatomaceous silica | 47.5 |

The above composition is blended and micropulverized until substantially all particles are less than 50 microns. The resulting wettable powder can be added to water and sprayed, or extended with heavy diluents to form a dust. For example:

| | Percent |
|---|---|
| Composition above | 20 |
| Ground pyrophyllite | 80 |

These components are blended in a ribbon or cone blendor to form a 10% active dust.

The 10% active dust is applied in thorough coverage by means of a hand crank-operated duster to both the upper and lower surfaces of the foliage of rose bushes still wet with morning dew. Infesting aphids such as the potato aphid (*Macrosiphum euphorbiae*) and the rose aphid (*Macrosiphum rosae*) as well as feeding-adults of the Japanese bettle (*Popillia japonica*) are controlled by this application. The above dust can be formulated to contain 5% "Manzate"® in the finished product to also give control of the disease called black spot (*Diplocarpon rosae*), which frequently affects roses. Roses treated with this combination make good growth, possess shiny deep-colored foliage and produce neumerous buds. Adjacent untreated bushes exhibit poor growth, drop numerous yellowed leaves and fail to produce the expected crop of blooms.

EXAMPLE 17

A wettable powder formulation of Example 16 is prepared using methyl 1-(dimethylcarbamoyl)-N-(methylcarbamoyloxy)formimidate as the active ingredient. This formulation is used to treat farm land in Florida infested with the stubby-root nematode (*Trichodorus christiei*) and the lesion nematode (*Pratylenchus zeae*). The material is applied as a spray at the rate of 2.25 to 4.5 kilograms of active ingredient per hectare of land and thoroughly mixed with the soil by disking. Sweet corn planted in this treated field develops a deep and extensive root system, makes rapid growth and yields a heavy crop of marketable ears. Corn in a nearby untreated field grows slowly and produces a low yield.

EXAMPLE 18

The wettable powder formulation of Example 17 is sprayed around young, bearing apple trees in Holland that are infested with lesion nematodes (Pratylenchus spp.). Application is made by spraying within the drip line of the trees at the rate of 2.25 to 4.5 kilograms of active ingredient per hectare of area actually treated. The trees make rapid growth as a result of the treatment in contrast to nearby untreated trees.

EXAMPLE 19

Chickens are temporarily removed from a poultry house and surrounding areas which are heavily infested with the fowl tick (*Argas persicus*). The house and areas are thoroughly dusted with a 10% dust formulated from the dust concentrate of Example 16. The infestation is controlled and the poultry returned to the house soon assumes a healthy appearance and resumes egg-laying at the normal level.

EXAMPLE 20

The wettable powder formulation of Example 16 is applied in a spray covering a 25 centimeter band over the open furrow as cotton seed are being planted. For this type of application 2.5 kilograms of active ingredient per 10,000 meters of row is applied in 75 liters of water. The active ingredient of this invention moves by means of systemic action from the soil into the cotton seedlings to render them toxic to certain sucking insects. Infestations of aphids, thrips species and plant-sucking bugs are thereby controlled. Plants in the treated area grow rapidly and produce full green foliage. Plants in a similar but untreated area grow slowly and have thickened silvery leaves, the latter due to thrips injury.

Much higher use rates for the pesticidal formulation than those given above can be employed with complete safety to the cotton plants.

EXAMPLE 21

| | Percent |
|---|---|
| Isopropyl 1-carbamoyl-N-(methylcarbamoyloxy) formimidate | 25.0 |
| Alkyl naphthalene sulfonic acid, Na salt | 0.5 |
| Sodium N-methyl-N-palmitoyl taurate | 2.0 |
| Attapulgite clay | 72.5 |

The above components are blended and micropulverized until substantially all particles are below 50 microns.

This formulation is dispersed in water at the rate of 480 grams of the above formulation in 10 liters of water and used to spray to the point of run-off the walls, floors, stalls, and pens of barns infested with the house fly, *Musca domestica*. Control of this troublesome pest results.

The other compounds of Formula I can be similarly formulated to give a satisfactory wettable powder.

(C) Dust base

EXAMPLE 22

| | Percent |
|---|---|
| Methyl 1-carbamoyl-N-(dimethylcarbamoyloxy) formimidate | 80 |
| Micaceous talc | 20 |

The above components are blended and micropulverized until substantially all particles are less than 100 mesh. The resulting free flowing powder can be diluted with the same or other extenders to produce 2–25% active dusts by simple blending.

The above dust concentrate is blended with talc to give a 5% active finished dust. When this dust is applied in thorough coverage by means of a crank-operated duster to potato plants infested with the potato aphid, *Macrosiphum euphorbiae*, and the green peach aphid, *Myzus persicae*, excellent control of the infestation results. When other insects such as Colorado potato beetle, flea beetles and leafhoppers are present, addition of one of the following products to the pesticidal formulation can be made to improve control: DDT, carbaryl, "Guthion"®, or methoxychlor.

(D) Water-miscible solution

EXAMPLE 23

| | Percent |
|---|---|
| Methyl 1-carbamoyl--N-(methylcarbamoyloxy) formimidate | 25 |
| Polyethylene oxide modified sorbitan monotall oil ester | 5 |
| Dimethylformamide | 70 |

A homogeneous solution is prepared by simple mixing of the above components. When added to water, there is a temporary milkiness produced by separation of the active followed by total solution if the final active concentration is low. In a low volume concentration spray, some active may remain undissolved but coarse crystal growth is inhibited by the presence of the surfactant.

The above emulsifiable concentrate is diluted with water and sprayed at the rate of 17 kilograms per hectare of active ingredient in 115 dekaliters of water on a field infested with the sugar beet nematode (*Heterodera schachtii*) and the chemical is worked into the soil to a depth of 6 inches. Sugar beets subsequently grown in this field develop normally and are substantially free from infestation by nematodes. In a similarly infested but untreated area in the same field, beets are distorted and yields reduced.

EXAMPLE 24

The water-miscible formulation of Example 23 is dispersed in water and used to treat cotton seed at the rate of 750 grams of the active ingredient per 100 kilograms of seed. Seed treated in this manner produce seedlings which are protected from attacking insects and control infestations of the cotton aphid (*Aphis gossypii*), the serpentine leaf miner (*Liriomyza brassicae*) and tobacco thrips (*Frankliniella fusca*) for a period up to 3 weeks or more after planting.

Cotton survival is also improved if chloroneb is applied to the cotton seed along with the above concentrate at the rate of 375 grams of active per 100 kilograms of seed. And cotton survival is further improved if, as a third component of the treating preparation, "Ceresan"® L is applied in an amount to provide 200 milliliters of "Ceresan"® L per 100 kilograms of cotton seed. The chloroneb in this mixture can be replaced by one or more of the following: pentachloronitrobenzene; captan; tetramethylthiuram disulfide; 1-chloro-2-nitropropane; 5-ethoxy-3-trichloromethyl-1,2,4-thiadazole; and p-dimethylaminobenzenediazo sodium sulfonate.

EXAMPLE 25

The water-miscible composition of Example 23 is dispersed in water and applied as a wetting spray by means of a hydraulic sprayer at a rate of 1 kilogram active per hectare to cabbage plants infested with the imported cabbageworm, *Pieris rapae*, and the cabbage looper, *Trichoplusia ni*. Treated plants are protected from the worm feeding and produce firm heads with full wrapper leaves. Plants in a nearby untreated row are riddled by the worm feeding and produce mostly unmarketable heads.

EXAMPLE 26

The water-miscible formulation of Example 23 is added to water at the rate of 30 grams per 100 liters. The roots and lower stem of woody nursery stock known to be infested with the lance nematode (*Hoplolaimus coronatus*) are dipped in this solution for three minutes. When stock so treated is planted it grows well and is of good appearance. Similar stock which is not treated grows

EXAMPLE 27

The water-miscible formulation of Example 23 is added to water in an amount to give 90 grams of the active compound per 100 liters. Tobacco plants infested with tobacco budworm (*Heliothis virescens*) and hornworms (Manduca spp.) are sprayed with the above material to run-off. Excellent control is obtained by applications made on a 10-day interval.

EXAMPLE 28

| | Percent |
|---|---|
| Allyl 1-carbamoyl-N-(methylcarbamoyloxy)formimidate | 25 |
| Dimethylsulfoxide | 75 |

A clear solution is formed when these components are mixed. When used at the rate of 0.5 pound active per 100 gallons water a clear solution results.

This composition is diluted with water to give a final concentration of 0.2% active. House flies, *Musca domestica*, and other flies such as stable flies, *Musca autumnalis*, are controlled in farm buildings, barns, and outdoor locations such as pens and corrals by spraying with this preparation as a space spray using a mist blower.

(E) Oil suspension

EXAMPLE 29

| | Percent |
|---|---|
| Ethyl 1-carbamoyl-N-(ethylcarbamoyloxy)formimidate | 30 |
| Polyethylene oxide lauryl ether | 8 |
| Low viscosity white oil (Liteteck oil) | 62 |

The above components are mixed and sand milled until the active is substantially all below 10 microns. The resulting suspension can be emulsified in water and sprayed or can be diluted with a nonphytotoxic paraffin oil and sprayed. For ultra low volume use the concentrate can be sprayed as it is.

This formulation when diluted with water to give 2.2 kilograms of active ingredient per 230 liters is sprayed at the rate of 230 liters per hectare on corn directing the spray toward the silks of developing ears. When applied in such a manner during the silking period at an interval of 1 to 2 days, an infestation of the corn earworm, *Heliothis zea*, is controlled.

EXAMPLE 30

The oil suspension of Example 29 is diluted with a paraffin oil to give 2.4 kilograms active per 100 liters. This is applied as a spray by means of airplane at the rate of 9.4 liters per hectare to marshlands and swampy areas serving as the breeding grounds for various species of mosquitoes. Control of the developing mosquito larva is obtained with this application.

(F) Aerosol formulation

EXAMPLE 31

| | Percent |
|---|---|
| Methyl 1-carbamoyl-N-(methylcarbamoyloxy)formimidate | 2 |
| Equal wt. mixture of "Freon 11"® and "Freon 12"® | 98 |

The above mixture is cold packed in an aerosol can for flying insect control.

The above aerosol is discharged at the rate of 140 to 350 grams of active ingredient per 1,000 cubic meters of space in a greenhouse in which carnations are growing. Plant injury is prevented by attaching a wand to the aerosol container and discharging the material above the plants. This application controls aphids such as the green peach aphid, *Myzus persicae*, and the leaf-curl plum aphid, *Aphis helichrysi*, infesting the carnation plants.

(G) Aqueous dispersion

EXAMPLE 32

| | Percent |
|---|---|
| Allyl 1-carbamoyl-N-(dimethylcarbamoyloxy)formimidate | 35 |
| Carbopol 934 (a polyacarboxylic hydrocarbon polymer) | 0.4 |
| 10% aqueous NaOH | 1.00 |
| $Na_2HPO_4$ | 1.00 |
| "Elvanol"® 51–05 (polyvinyl alcohol) | 1.00 |
| Sulfated tallow defoamer | 0.1 |
| Water | 61.5 |

The Carbopol and Elvanol are first blended dry with the active to avoid lumping. The NaOH and $Na_2HPO_4$ are predissolved in the water. The solids and antifoam are then added and the mix sand ground until the active is substantially all below 10 microns.

The aqueous dispersion is diluted with water and sprayed on selected plots in a strawberry field known to be heavily infested with the bud and leaf nematode (*Aphelenchoides besseyi*). The spray solution contains 120 grams active of the composition of this invention per 100 liters of water. The volume of application is such as to provide 2.2 kilograms of the active ingredient per hectare of plot area. All above-ground parts are thoroughly wetted. The strawberry plants in the sprayed plots grow well and give a good yield. In the unsprayed portions of the field the plants are yellow, grow slowly and produce a poor yield.

(H) Granules

EXAMPLE 33

| | Percent |
|---|---|
| Methyl 1-carbamoyl-N-(methylcarbamoyloxy)formimidate | 2 |
| Dimethylformamide | 4 |
| Granular attapugite with particles ranging from 0.25 to 0.6 mm. | 94 |

The active ingredient is first dissolved in the dimethylformamide at an elevated temperature and is then sprayed upon the attapulgite while it is being tumbled. Due to low volatility the solvent remains in the granule for an extended time but does slowly evaporate.

The other compounds of Formula I can be formulated as granules in the same manner.

The above granular formulation, containing methyl 1-carbamoyl-N-(dimethylcarbamoyloxy)formimidate as the active component, is applied in the planting furrows of potatoes at the rate of 3 kilograms of active ingredient per 10,000 meters of row. Certain soil-infesting pests of potatoes such as white-fringed beetle larvae, mole crickets and wireworm larvae are greatly reduced in numbers. The potato plants are protected from infestations of potato aphid, *Macrosiphum euphorbiae*, and green peach aphid, *Myzus persicae*, due to the systemic movement of the compound of this invention from the soil up into the potato foliage.

EXAMPLE 34

| | Percent |
|---|---|
| Methyl 1-(carbamoyl-N-(dimethylcarbamoyloxy)formimidate | 5 |
| Polyethylene oxide trimethylnonyl ether | 5 |
| Granular vermiculite | 89 |
| Synthetic fine silica | 1 |

The active and fine silica are first mixed and micropulverized. This dust is then mixed briefly with the granular vermiculite and sprayed with the liquid surfactant.

Other compounds of Formula I can be formulated as granules in the same manner.

The above granular formulation, containing methyl 1-carbamoyl-N-(methylcarbamoyloxy)formimidate as the active ingredient, is applied in the furrow with cotton seed at the time of planting at the rate of 2.5 kilograms of the active ingredient per 10,000 meters of row. The resulting seedlings are protected from attacking insects due to the systemic movement of the compound of this invention from the soil into the seedling. Infestations of the cotton aphid, *Aphis gossypii*, various thrips species, and the serpentine leaf miner, *Liriomyza brassicae*, are controlled for a period up to 3 or 4 weeks.

EXAMPLE 35

The granular formulation of Example 34 containing methyl 1 - carbamoyl-N-(methylcarbamoyloxy)formimidate as the active ingredient is applied as sidedress treatment to cotton plants at the start of squaring (fruiting) at the rate of 7.5 kilograms of active ingredient per 10,000 meters of row. Adult boll weevils, *Anthonomus grandis*, emerging from hibernation and feeding on the foliage and young fruit buds are controlled due to the systemic movement of the compound of this invention from the soil up into the plant parts.

EXAMPLE 36

The granular formulation of Example 34 containing methyl 1-carbamoyl - N - (methylcarbamoyloxy)formimidate as the active ingredient is applied in the furrow with corn seed at the time of planting at the rate of 2.5 kilograms of the active ingredient per 10,000 meters of row. Larvae of the northern corn rootworm, *Diabrotica longicornis*, and the western corn rootworm, *Diabrotica virgifera*, hatching from eggs deposited by adult females in the soil the previous fall and attacking the corn roots are controlled. The corn makes rapid growth, develops a deep root system that prevents the plants from lodging during windy periods and produces a good yield. Plants in a nearby area left untreated develop a shallow root system that causes a goodly percentage of lodged plants and the yield is greatly reduced.

EXAMPLE 37

The granular product of Example 34 is applied to soil infested with plant-pathogenic nematodes at a rate of 20 kilograms active agent per hectare using a conventional fertilizer spreader. The active agent is then worked into the soil by disking. This treatment gives substantially complete control of a high population of the sting nematode (*Belonolaimus longicaudatus*) as shown by a nematode count 15 days after treatment. In a similar area that remains untreated, the population of the sting nematode continues at a damaging level.

EXAMPLE 38

| | Percent |
|---|---|
| Allyl 1-carbamoyl - N - (methylcarbamoyloxy)formimidate | 10 |
| Gypsum plus ammonium sulfate | 90 |

The above components are blended and granulated by the procedure described in U.S. Pat. No. 3,168,437, to give rapidly disintegrated granules ranging in particle size from 0.25 to 1 mm.

The other compounds of Formula I can be substituted for the active ingredient shown above and the active concentration can range from 2–50% without loss of physical properties.

The above granular formulation is applied at the rate of 20 kilograms of active ingredient per hectare using a conventional fertilizer spreader. The material is then worked into the soil by disking. Tobacco grown subsequently in this field is substantially free from infestation by the lesion nematode (*Pratylenchus brachyurus*) and the southern root knot nematode (*Meloidogyne incognita*). Soil-infesting insects such as mole crickets and wireworm larvae that damage tobacco are also controlled. The tobacco plants in this field make rapid growth and yield well while tobacco on a similar but untreated area grows slowly and produces little marketable leaf.

Methyl 1 - (dimethylcarbamoyl)-N-(methylcarbamoyloxy)formimidate is formulated as a granule in the same manner. Application of this formulation to a fiield at the rate of 5 kilograms of active ingredient per hectare, with a fertilizer spreader, is followed by disking into the soil. Tobacco grown in this field is protected from attack by the lesion nematode and southern root-knot nematode. As a consequence, the plants make rapid growth and yield well.

EXAMPLE 39

The formulation of Example 38 with methyl 1-(dimethylcarbamoyl) - N - (methylcarbamoyloxy)formimidate as the active component is applied at the rate of 5 kilograms of active ingredient per hectare with a fertilizer spreader to a field infested with the soybean cyst nematode (*Heterodera glycines*). The granules are thoroughly mixed into the soil by disking. Soybeans grown in this field produce vigorous green plants that yield well. Plants grown in a nearby untreated field are small, have yellowish foliage and yield poorly.

EXAMPLE 40

The formulation of Example 38 with methyl 1-(dimethylcarbamoyl) - N - (methylcarbamoyloxy)formimidate as the active component is applied at the rate of 5 to 12.5 kilograms of active ingredient per 10,000 meters of row in a potato field infested with the golden nematode (*Hecterodera rostochiensis*). Application is made by dribbling the granules in the open furrow prior to placing the potato seed pieces. The potato plants in this field produce dark-green vigorous plants and a high yield of potatoes at the end of the season. A nearby untreated field produces small plants that yield poorly at the end of the season.

EXAMPLE 41

The formulation of Example 38 with methyl 1-(dimethylcarbamoyl) - N - (methylcarbamoyloxy)formimidate as the active component is used to treat a field in which grape cuttings are to be set and which is infested with the dagger nematode (*Xiphinema index*). Application is at the rate of 4 to 8 kilograms of active ingredient per hectare with a fertilizer spreader followed by disking into the soil. Grape vines grown in this field are protected from the dagger nematode and the virus that it transmits while causes a condition known as "fanleaf."

EXAMPLE 42

The formulation of Example 38 with methyl 1-(dimethylcarbamoyl) - N - (methylcarbamoyloxy)formimidate as the active component is used to treat a field in Hawaii infested with the reniform nematode (*Rotylenchulus reniformis* and the pin nematode (*Paratylenchus minutus*). Application is at the rate of 3 to 8 kilograms of active ingredient per hectare with a fertilizer spreader followed by disking into the soil. Pineapple plants grown in this field develop a deep extensive root system and make good growth. Plants in a nearby untreated field are small and grow slowly due to a poor root system.

EXAMPLE 43

The formulation of Example 38 with methyl 1-(dimethylcarbamoyl) - N - (methylcarbamoyloxy)formimidate as the active component is used to treat celery in Connecticut in land infested with the pin nematode (*Paratylenchus hamatus*). After the small plants are set in the field, the granules are applied as a side-dressing on both sides of the row in the amount of 5 to 12.5 kilograms of active ingredient per 10,000 meters of row. Overhead irrigation is applied to aid in the break-down of the granules and to wash the active ingredient into the soil. The celery plants in this field grow rapidly and develop a deep green color while plants in a nearby untreated field are stunted and chlorotic.

EXAMPLE 44

The formulation of Example 38 with methyl 1-(dimethylcarbamoyl) - N - (methylcarbamoyloxy)formimidate as the active component is applied around young coconut-palm trees infested with the coconutpalm nematode (*Rhadinaphelenchus cocophilus*). The material is applied within the drip-line of the trees at a rate of 5 to 8 kilograms of active ingredient per hectare of area actually treated. The granules are then lightly worked into the soil. Trees so treated continue to grow and bear while nearby untreated trees grow slowly and eventually die.

EXAMPLE 45

The formulation of Example 38 with methyl 1-(dimethylcarbamoyl) - N - (methylcarbamoyloxy)formimidate as the active component is used to treat young tea plants in Ceylon infested with lesion nematodes (Pratylenchus spp.). The granules are dribbled along each side of the row of young plants so that 5 to 12.5 kilograms of active ingredient is applied per 10,000 meters of row. The granules are then worked lightly into the soil. Applications are repeated at six-month intervals. Plants treated in this manner grow rapidly and yield early compared to untreated plants.

EXAMPLE 46

The formulation of Example 38 with methyl 1-(dimethylcarbamoyl) - N - (methylcarbamoyloxy)formimidate as the active component is applied around young banana plants in Honduras infested with burrowing nematodes (*Radopholus similis*) and lesion nematodes (Pratylenchus spp.). The granules are distributed around the young plants to cover the root area at a rate of 2.25 to 5.6 kilograms of active ingredient per hectare of area actually treated. The granules are worked lightly into the soil and are dissolved by the soil moisture. The application is repeated after about 3 months to give complete control of nematode injury. Plants treated in this manner grow rapidly and bear heavily while untreated plants grow slowly and bear little fruit.

EXAMPLE 47

Cotton is treated in-the-row at planting time with the formulation of Example 38 with methyl 1-(dimethylcarbamoyl) - N - (methylcarbamoyloxy)formimidate as active ingredient. The application rate is two kilograms (active) per 4000 meters of row. A second application of these granules is made as a side dress 5–8 cm. below ground level on each side of the cotton when the plants are in the second true leaf stage. These treatments control nematodes such as Pratylenchus spp. and Meloidogyne spp., early season insects such as thripe, and boll weevils for an extended period of time. They also emphasize maximum use of insect predators for control of the bollworm.

EXAMPLE 48

Methyl 1 - (dimethylcarbamoyl)-N-(methylcarbamoyloxy)formimidate is dissolved in water used as the transplant water for strawberry plants so that 20 milligrams of the compound is applied with each plant. The material is translocated within the plant to protect the developing young leaves from the bud and leaf nematode (*Aphelenchoides besseyi*) which causes a condition known as summer crimp. Protected plants make rapid growth and high yield while nearby unprotected plants exhibit small deformed leaves and produce little or no fruit.

EXAMPLE 49

Methyl 1 - (dimethylcarbamoyl)-N-(methylcarbamoyloxy)formimidate is slurried in water and used to treat cucumber seed at the rate of 1.25 grams of chemical to 1 kilogram of seed. Seed treated in this manner produce seedlings that are protected from attack by southern root-knot nematode (*Meloidogyne incognita*) for a period up to three weeks after planting. Periods of longer protection are obtained by treating the seed at higher rates. Plants thus protected develop deep and dense root systems, make rapid growth and produce early and heavy yields of marketable cucumbers.

The compound of this invention is very safe to the seed and can be used at rates as high or higher than 10 grams of chemical to 1 kilogram of seed without causing any injury whatsoever to the seedlings. A seed treatment such as thiram is used in conjunction with the compound of this invention to protect the seed from fungal attack after planting.

EXAMPLE 50

Methyl 1 - (dimethylcarbamoyl)-N-(methylcarbamoyloxy)formimidate is dissolved in water to give a concentration of 2000 parts per million. A wetting agent, Triton X–100, is added to this solution at the rate of 300 parts per million. Narcissus bulbs infested with the stem nematode (*Ditylenchus dipsaci*) are soaked in this bath for one-half to one hour followed by a drying period. Bulbs treated in this manner produce vigorous plants with dark-green foliage while untreated bulbs produce weak and small plants with mottled or chlorotic foliage.

EXAMPLE 51

Methyl 1-(dimethylcarbamoyl)-N-(methylcarbamoyloxy)-formimidate is slurried in water and used to treat rice seed infested with the rice white tip nematode (*Aphelenchoides besseyi*) at the rate of 5 to 10 grams of chemical to 1 kilogram of seed. Seed treated in this manner produce vigorous green plants while untreated seed produce plants with a condition known as "white tip."

Thiram fungicide is added to the seed treatment to control seedling blight.

EXAMPLE 52

Methyl 1-(dimethylcarbamoyl)-N-(methylcarbamoyloxy)-formimidate is applied to a young citrus grove in Arizona infested with the citrus nematode (*Tylenchulus semipenetrans*) by dissolving the chemical in the irrigation water. The equivalent of 4 to 5 kilograms per hectare of land is applied in 2.5 centimeters of irrigation water. The young trees are protected from the injury of the citrus nematode, make rapid growth and begin producing a marketable fruit crop. A nearby grove not treated in this manner has poor growth, less vigorous trees and produces a light crop of small fruit.

EXAMPLE 53

| | Percent |
|---|---|
| Methyl 1-(dimethylcarbamoyl) - N - (methylcarbamoyl)-formimidate | 20 |
| Methylthiolcarbamic acid, methyl ester | 80 |

The above formulation is diluted with mineral spirits and applied as a broadcast spray at the rate of 22 kilograms of formulation per hectare in a total volume of 60 liters per hectare to a field in Hawaii infested with the reinform nematode (*Rotylenchulus reniformis*) and the pin nematode (*Paratylenchus minutus*). The soil is then thoroughly mixed by disking. Pineapple plants grown in this field develop a deep extensive root system and make rapid growth. Plants in a nearby untreated field grow slowly due to a poor and shallow root system.

What is claimed is:

1. A compound of the formula

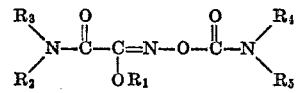

where:

$R^1$ is alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 chlorine atoms or with a methoxy, ethoxy, nitro, cyano, hydroxy, methylthio, carbomethoxy, carboethoxy, amino, methylamino, ethylamino, dimethylamino, methylethylamino, methylpropylamino, or diethylamino group;

$R_2$ and $R_3$ are the same or different and are hydrogen; alkyl of 1 through 4 carbon atoms; alkenyl of 3 through 4 carbon atoms; methoxy; or cycloalkyl of 3 through 5 carbon atoms; with the proviso that $R_2$ and $R_3$ do not contain a total of more than 7 carbon atoms, and are not both cycloalkyl or methoxy;

$R_4$ is hydrogen, alkyl of 1 through 3 carbon atoms, allyl, or propargyl; and $R_5$ is hydrogen or methyl.

2. A compound of claim 1 wherein:

$R_1$ is alkyl of 1 through 4 carbon atoms; allyl or alkyl of 1 through 4 carbon atoms substituted with 1 through 3 chlorine atoms or with a nitro, cyano, or methoxy group;

$R_2$ is hydrogen; alkyl of 1 through 4 carbon atoms; or methoxy;

$R_3$ is hydrogen or alkyl of 1 through 4 carbon atoms; and $R_4$ and $R_5$ are the same or different and are hydrogen or methyl.

3. A compound of claim 1 wherein:

$R_1$ is methyl, ethyl or allyl;

$R_2$ is hydrogen, alkyl of 1 through 4 carbon atoms, or methoxy;

$R_3$ is hydrogen or alkyl of 1 through 4 carbon atoms;

$R_4$ is hydrogen or methyl; and $R_5$ is methyl.

4. The compound of claim 1 in which $R_1$, $R_2$, $R_3$ and $R_4$ are each methyl, and $R_5$ is hydrogen.

5. The compound of claim 1 in which $R_1$, $R_2$, and $R_4$ are each methyl and $R_3$ and $R_5$ are each hydrogen.

6. The compound of claim 1 in which $R_1$ and $R_4$ are each methyl, and $R_2$, $R_3$, and $R_5$ are each hydrogen.

7. The compound of claim 1 in which $R_1$ is ethyl, $R_2$, $R_3$ and $R_4$ are each methyl, and $R_5$ is hydrogen.

8. The compound of claim 1 in which $R_1$, $R_2$, and $R_4$ are each methyl, $R_3$ is methoxy, and $R_5$ is hydrogen.

9. The compound of claim 1 in which $R_1$, $R_2$, and $R_4$ are each methyl, $R_3$ is ethyl, and $R_5$ is hydrogen.

10. A compound of the formula $$\begin{array}{c} R_3 \quad\quad O \\ \diagdown \quad\quad \| \\ N-C-C=N-OH \\ \diagup \quad\quad\quad | \\ R_2 \quad\quad OR_1 \end{array}$$

wherein:

$R_1$ is alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 chlorine atoms or with a methoxy, ethoxy, nitro, cyano, hydroxy, methylthio, carbomethoxy, carboethoxy, amino, methylamino, ethylamino, dimethylamino, methylethylamino, methylpropylamino, or diethylamino group; and $R_2$ and $R_3$ are the same or different and are hydrogen; alkyl of 1 through 4 carbon atoms; alkenyl of 3 through 4 carbon atoms; methoxy; or cycloalkyl of 3 through 5 carbon atoms; with the proviso that $R_2$ and $R_3$ do not contain a total of more than 7 carbon atoms, and are not both cycloalkyl or methoxy.

11. A compound of claim 10 wherein $R_1$ is alkyl of 1 through 4 carbon atoms; allyl; or alkyl of 1 through 4 carbon atoms substituted with 1 through 3 chlorine atoms or with a nitro, cyano, or methoxy group;

$R_2$ is hydrogen; alkyl of 1 through 4 carbon atoms; or methoxy; and $R_3$ is hydrogen or alkyl of 1 through 4 carbon atoms.

12. A compound of claim 10 wherein $R_1$ is methyl, ethyl or allyl;

$R_2$ is hydrogen, alkyl of 1 through 4 carbon atoms, or methoxy; and $R_3$ is hydrogen or alkyl of 1 through 4 carbon atoms.

13. A method of making a compound of the formula:

$$\begin{array}{c} R_3 \quad\quad H \\ \diagdown \quad\quad \| \\ N-C-C=N-OH \\ \diagup \quad\quad\quad | \\ R_2 \quad\quad OR_1 \end{array}$$

which comprises reacting a compound of the formula:

$$\begin{array}{c} R_2 \quad\quad O \\ \diagdown \quad\quad \| \\ N-C-C=N-OH \\ \diagup \quad\quad\quad | \\ R_3 \quad\quad Cl \end{array}$$

with two equivalents of base, at least the second of which is an alkoxide of the formula $R_1OM$, wherein M is $Na^+$, $Li^+$, $K^+$ or $Cs^+$;

$R_1$ is alkyl of 1 through 4 carbon atoms; alkenyl of 3 through 4 carbon atoms; alkynyl of 3 through 4 carbon atoms; cycloalkyl of 3 through 6 carbon atoms; or alkyl of 1 through 4 carbon atoms substituted with 1 through 3 chlorine atoms or with a methoxy, ethoxy, nitro, cyano, hydroxy, methylthio, carbomethoxy, carboethoxy, amino, methylamino, ethylamino, dimethylamino, methylethylamino, methylpropylamino, or diethylamino group; and $R_2$ and $R_3$ are the same or different and are hydrogen; alkyl of 1 through 4 carbon atoms; alkenyl of 3 through 4 carbon atoms; methoxy; or cycloalkyl of 3 through 5 carbon atoms; with the proviso that $R_2$ and $R_3$ do not contain a total of more than 7 carbon atoms, and are not both cycloalkyl or methoxy.

References Cited

UNITED STATES PATENTS

| | | | |
|---|---|---|---|
| 3,530,220 | 9/1970 | Buchanan | 424—320 |
| 3,557,190 | 1/1971 | Buchanan | 260—453 R |
| 3,576,834 | 4/1971 | Buchanan | 260—453 R |

FOREIGN PATENTS

| | | | |
|---|---|---|---|
| 1,101,785 | 1/1968 | Great Britain | 260—453 R |
| 1,467,548 | 12/1966 | France | 260—453 R |

OTHER REFERENCES

Brechbuehler et al., "Carbamoylformaldehyde Dimes" (1969) CA 71, No. 70150 (1969).

LEWIS GOTTS, Primary Examiner

G. HOLLRAH, Assistant Examiner

U.S. Cl. X.R.

260—239 A, 239 AA, 239 B, 293.65, 293.85, 293.86, 293.87, 293.88, 293.9, 326.8, 326.84, 326.85, 348, 465.4, 482 R; 424—200, 213, 222, 225, 226, 244, 267, 270, 273, 274, 278, 293, 298